United States Patent [19]

Walters et al.

[11] Patent Number: 4,581,272

[45] Date of Patent: Apr. 8, 1986

[54] AUTOMOTIVE VEHICLE DOOR KICK PANEL AND METHOD OF MANUFACTURE

[75] Inventors: Robert R. Walters; Ronald W. Adams, both of Auburn, Me.

[73] Assignee: Gates Formed-Fibre Products, Inc., Auburn, Me.

[21] Appl. No.: 690,709

[22] Filed: Jan. 11, 1985

[51] Int. Cl.⁴ .............................................. B32B 3/02
[52] U.S. Cl. ..................................... 428/88; 156/245; 428/95; 428/130; 428/156; 428/172; 428/192
[58] Field of Search ................... 428/88, 95, 156, 172, 428/130, 192; 156/245

[56] References Cited

U.S. PATENT DOCUMENTS 4,230,755 10/1980 Morris .................................. 428/95
4,424,250 1/1984 Adams ................................. 428/95

*Primary Examiner*—Marion C. McCamish
*Attorney, Agent, or Firm*—C. H. Castleman, Jr.; H. W. Oberg; F. P. Grassler

[57] ABSTRACT

The disclosure is of decorative vehicular kick panels e.g. for automobiles, and the method of their manufacture. The decorative panels are laminates of textile materials, having a decorative fabric surface. The panels of the invention are particularly advantageous in that they are economical to manufacture and exhibit resistance to edge fraying.

12 Claims, 3 Drawing Figures

AUTOMOTIVE VEHICLE DOOR KICK PANEL AND METHOD OF MANUFACTURE

BACKGROUND OF THE INVENTION

The invention concerns decorative panels and particularly concerns a laminate of textile materials having a decorative fabric surface, molded to form a kick panel for the door of an automotive vehicle.

Many baseline automotive interior doors are now made from vinyl-covered, wood-filled, resinated materials on highly automated equipment. To enhance the appearance of the door, a carpet insert known as the kick panel is added at the bottom. The door normally has had a ridge molded around the area where the carpet is to be inserted. A flat die cut piece of pressure-sensitive adhesive backed fabric is pressed into the space surrounded by the ridge which hides the fabric edge.

Door shapes have become more complex to maximize the interior space of down-sized cars, and contouring of the door and subsequently the kick panel have become necessary. The flat die cut door panels will not conform to the door without puckering, stretching or shrinking.

The carpet most often used is a tufted cut pile material with inherent fraying qualities when the material is die cut. The normal procedure for stopping this fraying is to add a binding strip around the edges or to coat the reverse side with a latex coating which holds the tufts in place during die cutting. This same binding or coating, however, stiffens the carpet and inhibits the contouring of the cut part when used on shaped doors.

To meet the demands of contoured doors and overcome the fraying problem of the edges, we have developed a technique of making door panel inserts using a non-woven moldable felt substrate covered with carpet and molded in such a manner that the edges are turned-down so they face towards the door panel onto which they are fastened. This effectively hides the edge and at the same time inhibits excessive fraying and loss of tufts. The curved edges of the panel are made possible by use of a non-woven moldable substrate in connection with a unique mold design and side cutting technique.

Examples of known vehicle door kick panels include those disclosed in U.S. Pat. Nos. 2,222,200, 2,542,181, 3,066,949, and 3,015,516.

SUMMARY OF THE INVENTION

Briefly described, in one aspect the invention is directed to a laminate vehicular door kick panel, comprising a backing surface comprised of a molded textile substrate including thermo-plastic fibers which are at least partially heat fused together; a facing surface formed of a textile fabric secured to said backing and mold formed together into a consolidated composite of desired shape-retaining configuration; said composite having a peripheral edge surface which is rolled over so as to extend in a direction opposite to said facing surface.

In another aspect, the invention is directed to a method for producing a laminate vehicular door kick panel having facing, backing and peripheral edge surfaces comprising preparing a batt of intermingled thermoplastic fibers; attaching a decorative surface formed of a textile fabric to the batt to form a composite; and heating the composite above the melting point of at least a portion of said thermoplastic fibers and mold-forming the composite into a desired shape-retaining configuration; said peripheral edge surfaces being rolled over so as to extend away from and in a direction opposite to said facing surface.

BRIEF DESCRIPTION OF THE DRAWINGS

Preferred embodiments of the invention will be illustrated in conjuction with the accompanying drawings, in which like numerals designate like parts, and in which.

DETAILED DESCRIPTION OF THE PREFERRED EMBODIMENTS OF THE INVENTION

Figure 1:
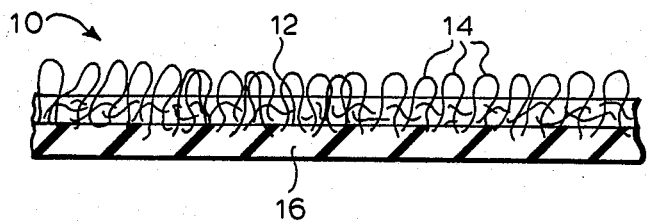
FIG. 1 is a cross-sectional scale elevation of a prior art kick panel.

FIG. 1 is a cross-sectional side elevation of a prior art automotive vehicle door kick panel 10. The panel 10 is a flat, die cut panel which comprises a scrim 12 of interwoven yarns bearing tufted fiber 14 loops, i.e., a carpet face. A latex coating 16 forms a backing to prevent fraying of the carpet. The panel 10 is adhered to a vehicle door with a conventional adhesive between the latex coating 16 and the door surface. To minimize fraying of the fibers 14 at the peripheral edges of the panel 10, a binding strip may be added (not shown in FIG. 1). Alternatively, a ridge molded in the door surface may be required to protect the peripheral edge of the panel 10.

Figure 2:
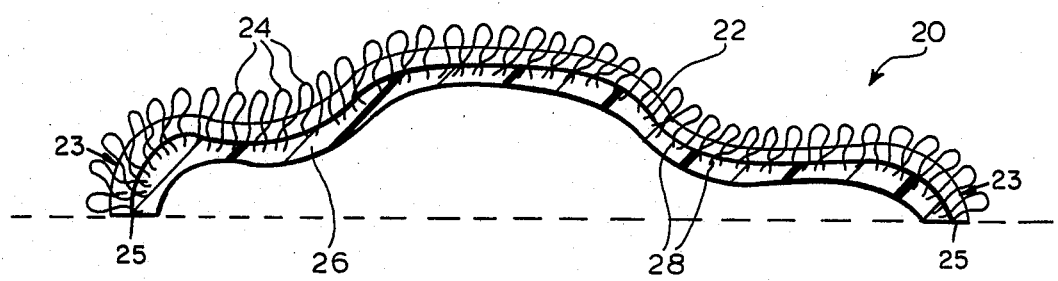
FIG. 2 is a cross-sectional side elevation of an embodiment kick panel of the invention.
Figure 3:
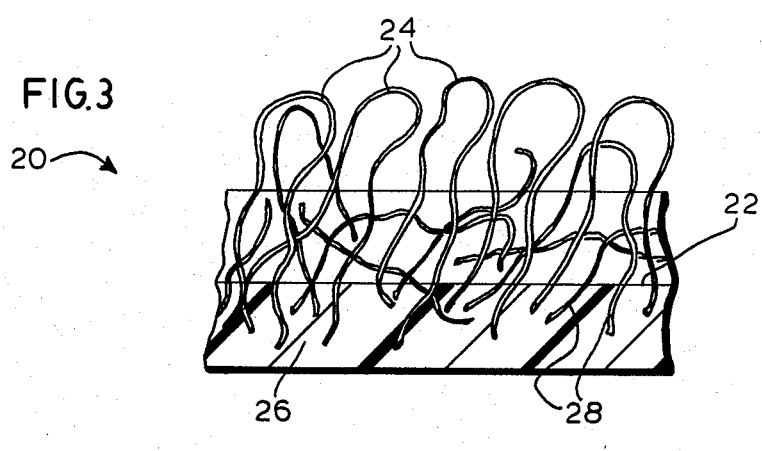
FIG. 3 is an enlarged view of a portion of the panel shown in FIG. 2.

FIG. 2 is a cross-sectional side elevation of an embodiment panel 20 of the invention which comprises a face of a textile fabric made of a scrim 22 of interwoven textile yarns or non-woven webbing to which there is anchored by tufting, tufts of fiber 24 loops. Alternatively, the textile fabric may be formed of a woven cloth, knit fabric or other woven material. The tufted carpeting or woven material is adhered to a base layer of a molded, textile substrate 26. Referring to FIG. 3, an enlarged view of a portion of the panel 20, one can see that the loose ends 28 of loops 24 are secured by embeddment or entrapment in the molded substrate 26.

The panel 20 of the invention may be assembled by first providing a web of woven, knit or non-woven thermoplastic, synthetic, heat fusible fibers, for forming the substrate layer 26. Representative of such fibers are staple fibers of polyolefin, polyethylene and polyester. Representative of such webs are non-woven webs of polypropylene and polyester staple fibers, which may be secured together by needling as described in U.S. Pat. No. 4,424,250. Preferably the web will have a weight of from about 200 to about 700 gms/m$^2$ and a thickness of from about 3 to about 12 mm. The web is laid up with a decorative fabric comprised of scrim 22 and fibers 24, preferably a non-woven, knit or tufted fabric. Representative of such fabrics are tufted nylon, polypropylene or polyester carpets. Preferably the fabric will have a weight of from about 150 to about 800 gms/m$^2$. The fabric covered composite web may be heated to an elevated temperature and then immediately passed into a laminating press designed to press mold (shape). It is cut into the desired shape and size of the product panel 20.

Thus, the panel 20 consists of an outer fabric layer forming a decorative surface, fused to an adjacent substrate layer of thermoplastic textile fibers. The two layers are consolidated by lamination under heat and pressure to form an integrated laminate structure of high strength, resistant to delamination and having esthetic beauty, while being shaped into any desired shape and cut to desired configuration.

During the lamination, sufficient heat is used to melt and fuse the thermoplastic fibers making up the substrate 26. Thus, the loose ends 28 of fibers 24 become anchored in layer 26 by the fused fiber melt from the layer 26. The pressure exerted in the laminate press is preferably within the range of from about 5 psi to 400 psi to effect the above described consolidation of the layers. If additional bonding is required a sheet of web adhesive can be inserted between the face surface (viz. at scrim surface 22) and the substrate.

Thus, considerable integration is effected between layer 26 and the carpet surface layer. The product panel 20 as shown in FIG. 2 is removed from the laminating press and allowed to cool to ambient temperatures. When cooled, the formed panel 20 will maintain its shape as formed and will exhibit dimensional stability, shape retention and durability. As shown in FIG. 2, the panel 20 need not be a flat panel, but by appropriate molding can be shaped to form interesting, curved panels for functional or decorative purposes. The salient feature of the molded panel 20 may be seen in that a substantial portion, if not all, of the surfaces 25 of the peripheral edge 23 of the panel are molded to position those surfaces on a plane substantially parallel to the axial plane (represented by the broken line in FIG. 2) of the panel 20 body, in general. In contrast, the panel 10 of the prior art (see FIG. 1) possesses such surfaces perpendicular to the same planar axis. Rolled over as shown in FIG. 2, the peripheral edge surfaces 23 of the panel 20 are protected when mounted on the interior surface of an automotive vehicle door, and fraying of the edge of the panel 20 is avoided. This is a major advantage of the panel 20 of the invention.

For simplicity of explanation, the embodiment of FIG. 2 as described above has been presented. However, those skilled in the art will appreciate that more complex panels of the invention may be made by employing substrates 26 of greater structural complexity such as is described in the U.S. Pat. No. 4,199,635. The only requirement of the substrate 26 is that it has a substantial amount of fusible fibers and that it be moldable and shape-retaining in order to support the textile fabric facing.

The following example describes the manner and process of making and using the invention and sets forth the best mode contemplated by the inventor of carrying out the invention but is not to be construed as limiting.

EXAMPLE

A 410 g/m$^2$ batt of 50%, 3 inch staple polypropylene and 50%, 3 inch staple polyester is prepared by carding and needling. The composite is prepared for molding by having a non-woven carpet formed of a tufted polyester carpet of 0.300" uncompressed thickness bonded to the batt by conventional needling techniques.

At a separate station, the composite is heated to a temperature of 365° F., above the melting point of polypropylene in a radiant heat type oven. The dwell time is sufficient to cause a softening and partial melting of the polypropylene fibers in layer 26, yet not long enough to cause a flow of molten polyester. Next, the composite is placed directly in a pre-gapped, matched, male/female mold, which is closed until the interior temperature of the fabric drops to below 240° F. Removal of the heated part before sufficient cooling results in warping and distortion of the molded part.

The gap at the edges of mold is crucial and is achieved with metallic shims to cause a spacing between parallel surfaces of 0.200". The pressure exerted on each square inch of the mold surface is greater than 40 pounds.

The mold edge gap provides a means of "rolling over" the peripheral edge of the composite panel to achieve the result described above and shown in FIG. 2. The molded position of the peripheral edge permits the peripheral edge surface to mate with the interior surface of the door to which the panel will be affixed.

After demolding the part is cut by a three dimensional contoured cutting blade unit which cuts in a plane perpendicular to the "rolled over" edge.

What is claimed is:

1. A laminate vehicular door kick panel, comprising:
    a backing surface comprised of a molded textile substrate including thermoplastic fibers which are at least partially heat fused together;
    a facing surface formed of a textile fabric secured to said backing and mold formed together into a consolidated composite of desired shape-retaining configuration;
    said composite having a peripheral edge surface which is rolled over so as to extend in a direction opposite to said facing surface.

2. The laminate panel of claim 1 wherein the backing and facing surfaces extend generally in an axial plane, and a substantial portion of said peripheral edges lie on a plane extending substantially parallel to the axial plane.

3. The laminate panel of claim 1 wherein the textile fabric is formed of a tufted carpet.

4. The laminate panel of claim 1 wherein the textile fabric is formed of a woven material.

5. The laminate panel of claim 1 wherein the backing surface is formed of at least two fiber materials, one having a relatively low melting point, and the other a relatively high melting point, said low melting point fibers being at least partially heat fused together.

6. The laminate panel of claim 5 wherein the textile fabric is comprised of fibers having loose ends which are securely anchored by embeddment in the molded textile substrate.

7. The laminate panel of claim 1 wherein said peripheral edge surface is formed solely of said mold-formed composite of backing and facing surfaces.

8. The laminate panel of claim 1 wherein the backing and facing surfaces are bonded with the addition of a web adhesive between backing and facing surface to enhance bond strength.

9. The laminate panel of claim 1 wherein the textile fabric is formed of a nonwoven material.

10. A method for producing a laminate vehicular door kick panel having facing, backing and peripheral edge surfaces comprising:
    preparing a batt of intermingled thermoplastic fibers;
    attaching a decorative surface formed of a textile fabric to the batt to form a composite; and
    heating the composite above the melting point of at least a portion of said thermoplastic fibers and mold-forming the composite into a desired shape-retaining configuration;
    said peripheral edge surfaces being rolled over so as to extend away from and in a direction opposite to said facing surface.

11. The method of claim 10 wherein said batt is prepared by needling.

12. The method of claim 11 wherein the decorative surface is attached to the batt by needling.

* * * * *